(12) United States Patent
Beylich et al.

(10) Patent No.: US 9,997,754 B2
(45) Date of Patent: Jun. 12, 2018

(54) FILTER ELEMENT

(71) Applicant: MANN+HUMMEL GMBH, Ludwigsburg (DE)

(72) Inventors: Markus Beylich, Ludwigsburg (DE); Friedrich Stolz, Sachsenheim (DE); Stephan Niemeyer, Steinheim (DE); Panagiotis Mavroidakos, Remseck (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 243 days.

(21) Appl. No.: 14/220,500

(22) Filed: Mar. 20, 2014

(65) Prior Publication Data
US 2014/0287282 A1    Sep. 25, 2014

(30) Foreign Application Priority Data
Mar. 20, 2013   (DE) .................. 10 2013 004 754

(51) Int. Cl.
*H01M 2/12* (2006.01)
*H01M 2/10* (2006.01)
*H01M 2/02* (2006.01)
*H01M 10/42* (2006.01)

(52) U.S. Cl.
CPC ......... *H01M 2/1223* (2013.01); *H01M 2/024* (2013.01); *H01M 2/1072* (2013.01); *H01M 2/1094* (2013.01); *H01M 10/4207* (2013.01); *H01M 2220/20* (2013.01)

(58) Field of Classification Search
CPC ............. H01M 2/1072; H01M 2/1094; H01M 10/4207; H01M 2220/20; H01M 2/024; H01M 2/1223
USPC ................... 429/53, 54, 58; 49/53, 54, 58
See application file for complete search history.

(56) References Cited

U.S. PATENT DOCUMENTS

| 844,755 | A | * | 2/1907 | Schalow | H01M 2/1229 137/535 |
|---|---|---|---|---|---|
| 4,052,534 | A | | 10/1977 | Devitt | |
| 6,110,617 | A | | 8/2000 | Feres | |
| 6,294,282 | B1 | * | 9/2001 | Misra | H01M 2/1205 429/54 |
| 2003/0215698 | A1 | | 11/2003 | Schulte-Ladbeck | |
| 2004/0028995 | A1 | | 2/2004 | Shelekhin et al. | |

(Continued)

FOREIGN PATENT DOCUMENTS

| DE | 7620138 U1 | 10/1976 |
|---|---|---|
| DE | 102009020185 A1 | 11/2010 |

(Continued)

*Primary Examiner* — Jonathan G Jelsma
*Assistant Examiner* — Omar M Kekia
(74) *Attorney, Agent, or Firm* — James Hasselbeck

(57) ABSTRACT

A seal arrangement for a housing for receiving a battery has a valve arrangement for compensating a pressure differential between an interior of the housing for receiving a battery and an environment outside of the housing for receiving a battery. A desiccant is provided for removing moisture from a gas contained in the interior or gas that flows into the housing for receiving a battery. A chamber is provided that is connected to the valve arrangement and that contains the desiccant, wherein the chamber and the valve arrangement are in gas-conducting communication with each other.

9 Claims, 5 Drawing Sheets

(56) References Cited

U.S. PATENT DOCUMENTS

| | | | |
|---|---|---|---|
| 2010/0323229 A1* | 12/2010 | Campau | H01M 2/1223 429/89 |
| 2012/0312161 A1* | 12/2012 | Reitzle | B01D 53/268 95/45 |
| 2013/0323545 A1 | 12/2013 | Gless | |
| 2014/0079964 A1 | 3/2014 | Gless | |

FOREIGN PATENT DOCUMENTS

| | | |
|---|---|---|
| DE | 102009035467 A1 | 2/2011 |
| DE | 102010028861 A1 | 11/2011 |
| DE | 102012202103 A1 | 8/2013 |
| GB | 2177016 A | 1/1987 |
| GB | 2177016 A1 | 1/1987 |

* cited by examiner

FILTER ELEMENT

CROSS-REFERENCE TO RELATED APPLICATION

This application claims the benefit of German patent application No. 10 2013 004 754.4, filed Mar. 20, 2013. The entire contents of the aforesaid German patent application are incorporated herein by reference.

BACKGROUND OF THE INVENTION

The present invention concerns a seal arrangement for a housing for receiving a battery.

U.S. Pat. No. 4,052,534 A discloses a battery venting plug with an acid-resistant two-way valve that automatically opens temporarily under gas pressure. Also, plastic beads are disclosed that provide a surface on which moisture can evaporate.

DE 10 2009 054 921 A1 discloses a device for reducing the moisture of a gas in a housing interior. In this context, gas is cooled by means of a cooling device so that a water vapor proportion of the gas condenses to water and the gas with reduced water vapor contents passes through a membrane into the housing interior.

SUMMARY OF THE INVENTION

It is an object of the present invention to provide an improved seal arrangement.

Accordingly, a seal arrangement for a housing for receiving a battery is provided, the seal arrangement comprising a valve arrangement, which is designed to compensate a pressure differential between an interior of the housing for the battery and an environment outside of the housing for the battery, and further comprising a desiccant, which is designed to remove moisture from the gas contained in the interior or gas that flows into it.

A battery is to be understood as an individual storage cell or an assembly of several interconnected storage cells for electrochemically storing electrical energy. The storage cell or storage cells can be rechargeable or non-rechargeable. For example, a battery in the form of a lithium ion battery can be provided.

Instead of or in addition to the battery, the interior of the housing for the battery can be designed for receiving an electronic device or a head light. The environment can be embodied by an additional chamber.

Temperature fluctuations, that occur, for example, when driving through a tunnel, during charging processes, discharging processes or use, lead to moist air within the battery housings. Providing the desiccant in combination with the valve arrangement can reduce the moisture in the air. This holds true in particular in case of the housings of batteries for electric or hybrid vehicles.

As a desiccant, a substance can be used that enables absorption of aqueous components from gases. For example, a substance can be used that chemically binds water. For example, substances such as silica gel can be used.

In embodiments of the invention, the seal arrangement is designed for a temperature range of −20 degrees Celsius up to 60 degrees Celsius. The seal arrangement can be designed for a pressure differential between interior and environment of 50 to 200 mbar.

In embodiments of the invention, the seal arrangement is designed such that a gas flow flowing from the environment into the interior of the housing of the battery is mandatorily guided through the desiccant. This is advantageous when air is flowing from the exterior into the housing for the battery because the air may contain moisture. Upon passing through the desiccant, moisture is removed from the air and this moisture does not reach the interior of the housing for the battery.

In embodiments of the invention, the valve arrangement is designed such that it can perform its function in two directions. In case of corresponding pressure differentials, the valve arrangement enables flow of gas from the environment into the interior of the battery housing and vice versa. The opening pressure of the valve arrangement can be adjusted such that pressure differentials that could damage the battery housing are avoided.

In embodiments of the invention, the seal arrangement is provided with a chamber which is in gas-conducting communication with the valve arrangement and contains the desiccant. In this way, the drying action can be realized in a simple way.

The chamber can have sections that are designed such that they enable entry and exit of gas, for example, air, and prevent exit of desiccant. For this purpose, the chamber can have passages, for example, in the form of cutouts.

In embodiments of the invention, the valve arrangement and the chamber are monolithically configured. This provides for simple assembly. In place of two individual components, only one component is mounted that combines the functions of pressure compensation and drying action. Also, it is possible in this way to reduce the number of sealing surfaces because only one opening must be provided in the housing for the battery for accommodating the seal arrangement.

Valve and chamber are, for example, joined from several components to a modular unit. In this context, the components are attached to each other in embodiments of the invention. Valve and chamber, or a seal housing of the seal arrangement that is receiving them or partially forming them, can also be formed together as an injection-molded part.

As material for the injection-molded part, polypropylene such as PP-HD (high-density polypropylene) can be provided, for example.

The seal arrangement can be provided with a connecting device for detachable attachment of the seal arrangement on the housing for the battery. In this way, the seal arrangement can be connected in a simple way with the housing for the battery and can be detached therefrom. This simplifies the assembly and the exchange of the seal arrangement for maintenance purposes.

As a connecting device, for example, a thread or a bayonet locking device can be provided. On the housing for the battery, a thread insert of metal matching the thread can be provided. The thread insert can be fluid-tightly connected to the housing for the battery.

In embodiments of the invention, the seal arrangement is provided with a seal, particularly radial seal, relative to the housing for the battery so that passage of gas between the seal arrangement and the housing for the battery is prevented.

In embodiments of the invention, a membrane is provided which closes an opening that gas-conductingly connects the valve arrangement with the environment or with the interior of the housing for the battery. Accordingly, a pressure compensation with simultaneous retention of liquids and solids can be realized.

It is possible to have a membrane which closes an opening that gas-conductingly connects the valve arrangement with the environment as well as a membrane which closes an opening that gas-conductingly connects the valve arrangement with the interior of the housing for the battery.

In embodiments of the invention, a membrane is arranged between the valve arrangement and a splash guard. Accordingly, the membrane can be protected from environmental influences. The splash guard can be provided in the form of a labyrinth.

In embodiments of the invention, a membrane is provided which closes an opening that gas-conductingly connects the desiccant with the environment or the interior. Accordingly, the interior can be protected from environmental influences. When the membrane is provided between desiccant and environment, the desiccant can be protected from environmental influences.

It is also possible to provide a membrane that closes an opening that connects gas-conductingly the desiccant with the environment as well as a membrane that closes an opening that gas-conductingly connects the desiccant with the interior of the housing for the battery.

A membrane can be arranged between valve arrangement and desiccant. Accordingly, for example, the valve arrangement can be protected from components of the desiccant. Also, the desiccant can thus be protected from environmental influences that might pass through the valve arrangement.

In embodiments of the invention, two membranes are provided. In this way, an increased safety with regard to penetration of foreign matter, for example, water, is provided. This can be particularly advantageous e.g. for high-voltage batteries because these may be safety-relevant components. One of the membranes can face the environment. In this context, even when this membrane is protected by a splash guard or, for example, a plastic cover, from environmental influences, for example, the direct attack of steam cleaners or pointed objects, the membrane is exposed possibly to other influences, for example, spray mist, oil droplets or chemicals. The second one of the membranes can be provided in a more protected position. For example, the second membrane can be facing the interior of the housing for the battery or may be facing the desiccant. In this way, the second membrane is capable of preventing penetration of foreign matter such as water even if the first membrane is damaged.

In embodiments of the invention, the valve arrangement is enclosed by two membranes. Since membranes can also retain particles, the valve arrangement is thus protected from particles that might soil the sealing seat of the valve arrangement.

In embodiments of the invention, the chamber is formed within a seal housing of the seal arrangement which is provided with radial cutouts that are closed by a grid or net. In this way, the desiccant can be brought particularly well into contact with the interior of the housing for the battery.

In embodiments of the invention, the connecting device in the form of an outer thread is formed on a seal housing of the seal arrangement which is provided with the valve arrangement in its interior. Valve and outer thread can thus be combined to a unit.

Also, a connecting device in another form can be combined with the valve arrangement. For example, the connecting device can be provided as a part of a bayonet locking device.

One and the same seal housing may be provided which, on the one hand, is provided with the chamber and, on the other hand, is provided with the connecting device as well as the valve arrangement. The seal housing can be embodied as an injection-molded part, in particular of polypropylene, for example, PP-HD.

Moreover, a housing with a battery and the seal arrangement according to the invention is provided.

Moreover, a vehicle, in particular an electric vehicle or hybrid vehicle, with the housing according to the invention is provided.

Further embodiments of the invention are subject matter of the dependent claims as well as of the embodiments of the invention disclosed in the following. In the following, the invention will be explained in more detail with the aid of embodiments with reference to the attached Figures.

BRIEF DESCRIPTION OF THE DRAWINGS

In the Figures, same reference characters indicate same or functionally the same elements, inasmuch as nothing to the contrary is indicated.

PREFERRED EMBODIMENTS OF THE INVENTION

Figure 1:
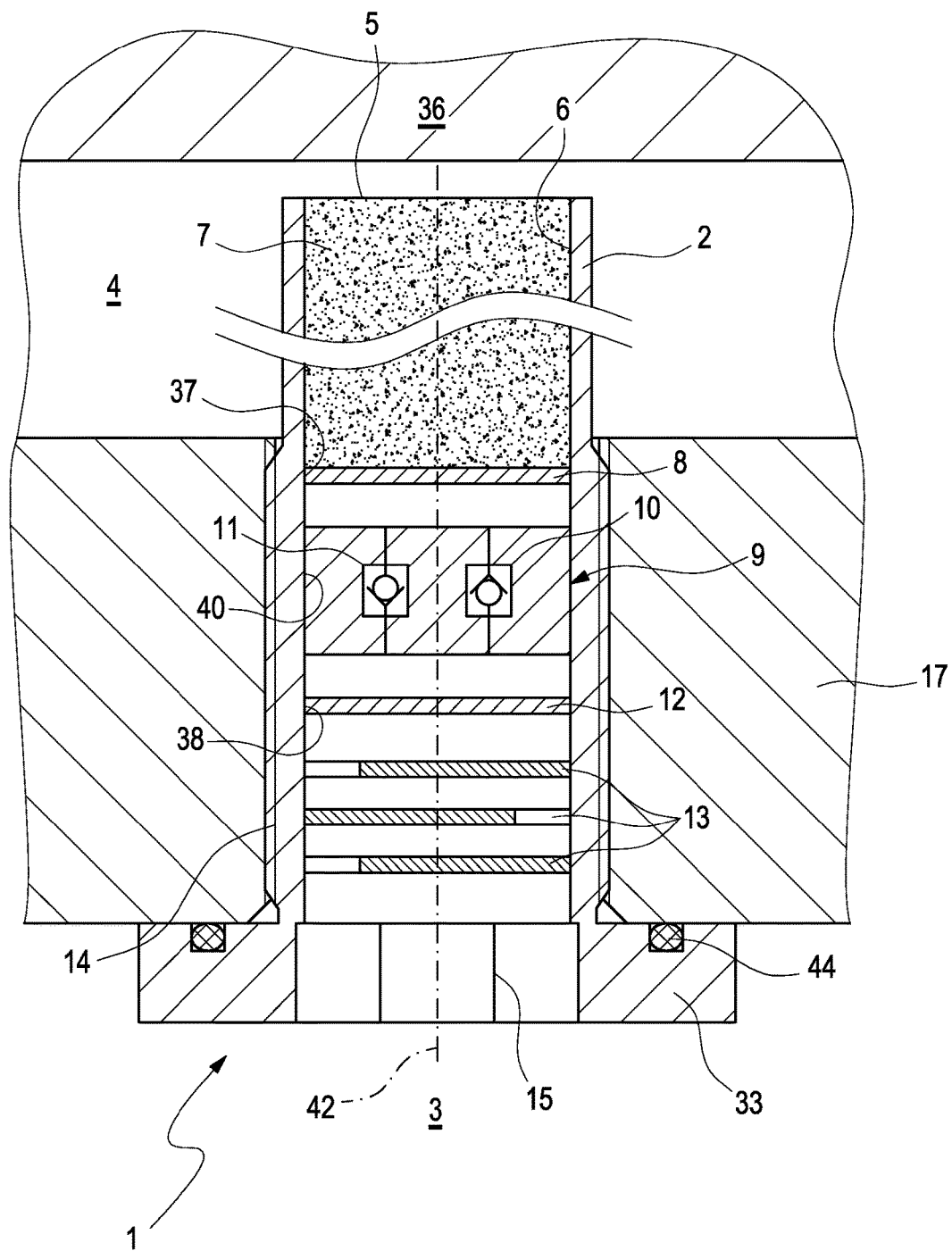
FIG. 1 shows in a section view a housing with a battery and a seal arrangement according to one embodiment.

FIG. 1 shows a seal arrangement 1. The seal arrangement 1 has a tubular seal housing 2. The seal housing 2 is open at opposite ends relative to the environment 3 and relative to an interior 4 of a housing 17 in which a battery 36 is received. In the seal housing 2, adjacent to an opening 5 that is open toward the interior 4 of the housing 17, a desiccant chamber 6 with a desiccant 7 is arranged. In the seal housing 2, on a side which is facing away from the opening 5 of the desiccant chamber 6, a gas-permeable first membrane 8 is provided. The first membrane 8 completely closes a cross-section 37 of the seal housing 2.

In the seal housing 2, on the side of the first membrane 8 which is facing away from the desiccant chamber 6, a valve arrangement 9 is provided. The valve arrangement 9 completely closes off a cross-section 40 of the seal housing 2. The valve arrangement 9 comprises a first valve 10 that is designed such that it opens when a pressure in the interior 4 of the battery housing 17 surpasses a predetermined differential pressure relative to a pressure in the environment 3. The valve arrangement 9 comprises moreover a second valve 11 that is designed such that it opens when a pressure in the environment 3 surpasses a predetermined differential pressure relative to a pressure in the interior 4 of the battery housing. The first valve 10 and the second valve 11 enable in the open state a flow of gas through the valve arrangement 9, respectively.

In the seal housing 2, on a side of the valve arrangement 9 facing away the first membrane 8, a gas-permeable second membrane 12 is provided. Like the first membrane 8, the second membrane 12 completely closes a cross-section 38 of the seal housing 2. In the seal housing 2, on the side that is facing the environment 3 of the second membrane 12, a splash guard 13 is provided. The splash guard 13 is designed such that gas or liquid cannot follow a linear path in order to pass from the environment 3 to the second membrane 12. In the shown embodiment, the splash guard 13 has three small plastic plates which are provided parallel to each other in the seal housing 2 and form a labyrinth.

The splash guard 13 protects thus the second membrane 12 from environmental influences such as direct water jets or objects. The valve arrangement 9 delimits a gas exchange between the interior 4 of the battery housing and the environment 3 to situations in which a pressure differential that is too high could damage the battery housing. The first membrane 8 protects the desiccant chamber 6 from liquids even in case the second membrane 12 is damaged. The desiccant 7 removes moisture from the air that is flowing through. Accordingly, the moisture contents in the interior 4 of the battery housing 17 can be kept low.

Figure 2:
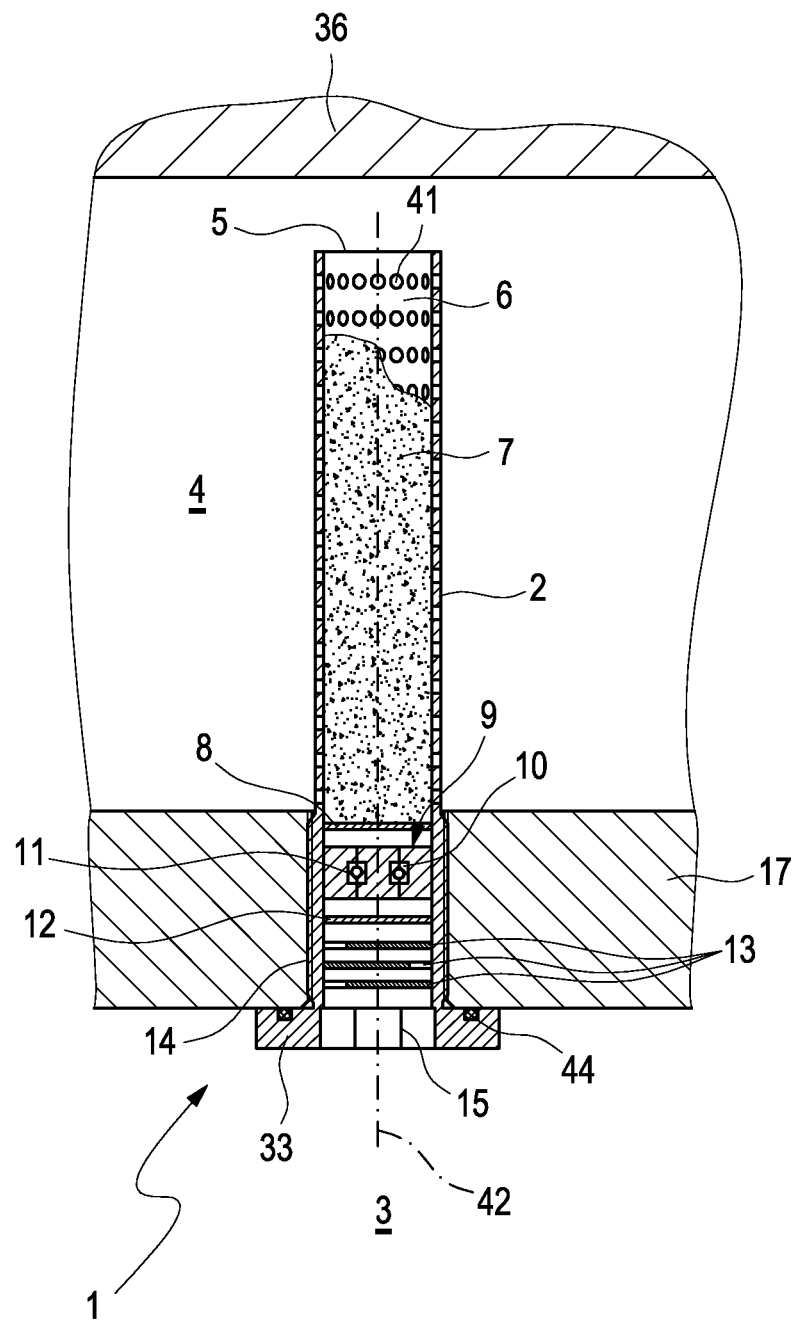
FIG. 2 shows in a partial section view a housing with a battery and a seal arrangement according to a further embodiment.

FIG. 2 shows a further embodiment of a seal arrangement 1 wherein in the following only differences relative to FIG. 1 will be discussed.

The desiccant chamber 6 is connected by a plurality of openings 41 with the interior 4. The seal housing 2 is provided with an outer thread 14. On a side of the splash guard 13 which is facing away from the valve arrangement 9, a hexagon socket 15 is provided on the seal housing 2.

The seal arrangement 1 is screwed with the outer thread 14 into an inner thread that is provided in the battery housing 17. An appropriate torque about longitudinal axis 42 of the seal housing 2 can be applied by means of the hexagon socket 15. A seal 44 is provided which seals on an exterior side of the battery housing 17 the seal arrangement 1 or seal housing 2 relative to the battery housing 17. The seal 44 prevents that air from the environment 3 can bypass the seal arrangement 1 and flow into the interior 4 of the battery housing 17.

Since the desiccant chamber 6 is provided with a plurality of openings 41, it can be flowed through in a simple way by air that is present within the battery housing 17. Accordingly, moisture can be removed from the air.

When overpressure or underpressure occurs in the interior 4 of the battery housing 17, a valve 10, 11 of the valve arrangement 9 will open. Air can flow through the valve arrangement 9, the two membranes 8 and 12, and the splash guard 13 from the environment 3 into the interior of the housing 4 or vice versa. The desiccant 7 that is contained in the desiccant chamber 6 is flowed through by the air and removes moisture from the air.

Figure 3:
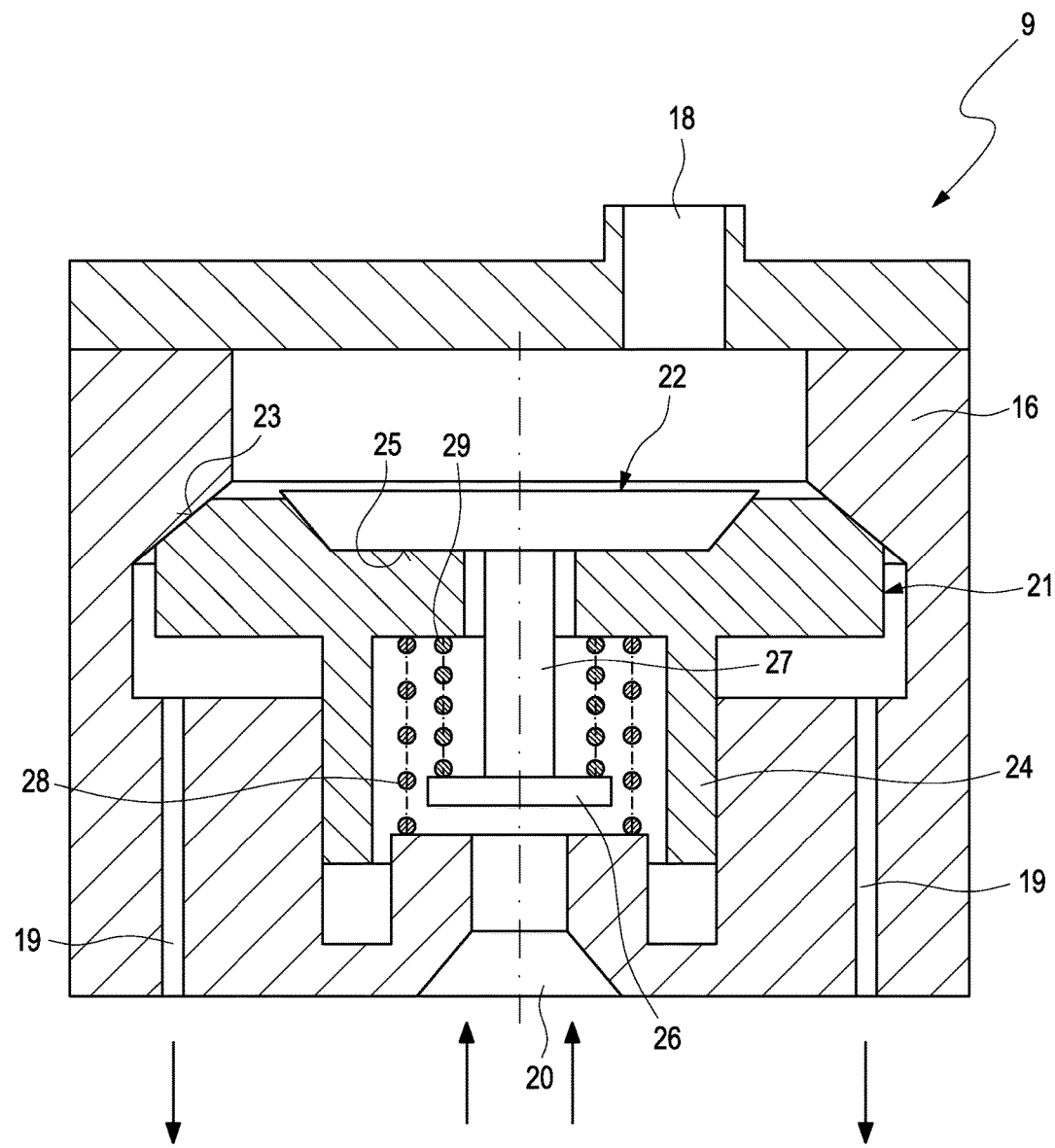
FIG. 3 shows in a section view a valve arrangement according to one embodiment.

FIG. 3 shows a principal sketch of an embodiment of a valve arrangement 9 as it can be used in a seal arrangement 1. The valve arrangement has a valve housing 16 with a first passage 18, second passages 19, and a third passage 20. In the interior of the valve housing 16, a first valve body 21 and a second valve body 22 are provided. The first valve body 21 has a first sealing section 23 and a first guide section 24. The second valve body 22 has a second sealing section 25, a spring stop 26, and a second guide section 27. In this context, the second guide section 27 is provided between the second sealing section 25 and the spring stop 26. In the first valve body 21, a recess is provided in which the second guide section 27 is arranged.

A first pressure spring 28 is arranged between the valve housing 16 and the valve body 21. The first pressure spring 28 is designed such that it forces the first valve body 21 with the first sealing section 23 such against the valve housing 16 that a connection between the first passage 18 and the second and the third passages 19, 20 is blocked. When the pressure in the first passage 18 surpasses a predetermined limit value, the first spring 28 is compressed and the connection is opened.

A second pressure spring 29 is arranged between the third spring stop 26 and the first valve body 21. It is designed to press the spring stop 26 and thus the second sealing section 25 in such a way against the first valve body 21 that the recess in the first valve body 21 is closed. When the pressure in the third passage 20 surpasses a predetermined limit value, the second pressure spring 29 is compressed and the recess in the first valve body 21 is thus opened. Then gas can flow from the third passage 20 to the first passage 18.

Accordingly, the valve arrangement 9 is designed to open for an overpressure as well as for an underpressure in the housing 16 when the pressure surpasses or drops below a predetermined threshold value.

Figure 4:
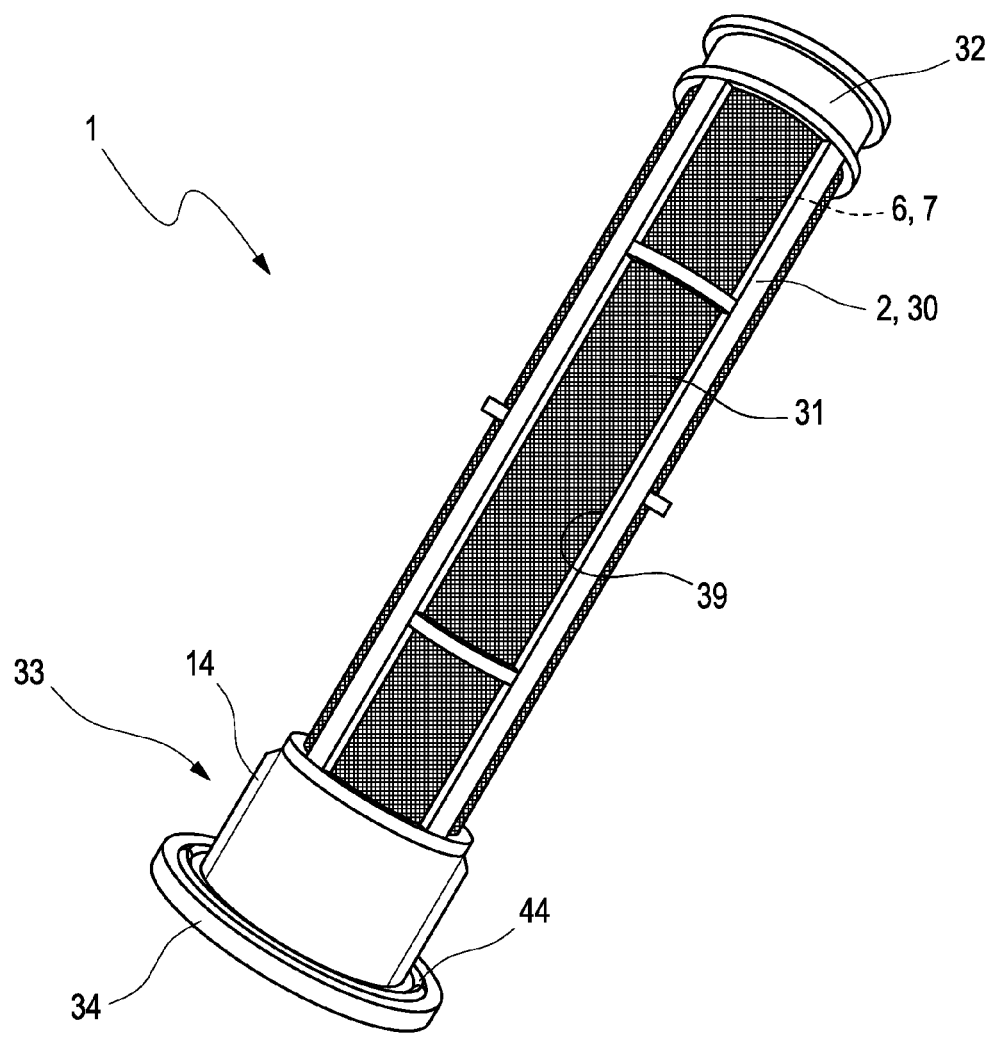
FIG. 4 shows in a perspective view a seal arrangement according to yet another embodiment.

FIG. 4 shows a further embodiment of a seal arrangement 1. The desiccant chamber 6 is formed by a seal housing 2 in the form of a grid-like tube 30. Appropriate cutouts are identified at 39. The tube 30 is manufactured of a polypropylene casting, for example. In the interior of the tube 30, a plastic net 31 is provided that is designed such that the desiccant 7 is retained in the interior of the tube 30. As a desiccant 7 silica gel is used here. A first end of the tube 30 is closed off by a plastic cover 32.

At a second end of the tube 30, a section 33 is provided. The latter has a plastic housing 34 that is manufactured together with the tube 30 as a monolithic cast part. On an outer surface of the plastic housing 34 an outer thread 14 is provided. In the plastic housing 34 a splash guard 13, a first membrane 8, a second membrane 12, and a valve arrangement 9 are provided. These components are not visible in FIG. 4. They are arranged in accordance with FIGS. 1 and 2.

Figure 5:
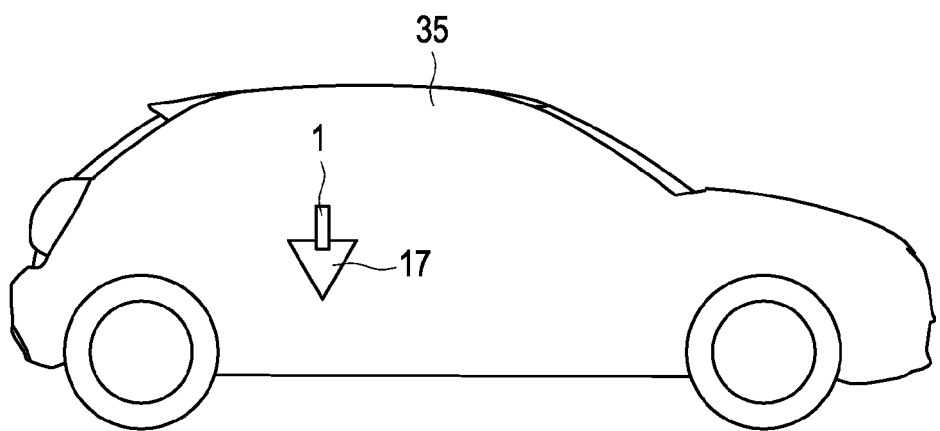
FIG. 5 shows a schematic drawing of a vehicle with a housing and a seal arrangement according to one embodiment.

FIG. 5 shows a schematic drawing of a vehicle 35 that has a battery housing with the afore described seal arrangement 1.

While specific embodiments of the invention have been shown and described in detail to illustrate the inventive principles, it will be understood that the invention may be embodied otherwise without departing from such principles.

What is claimed is:
1. A seal arrangement for a battery housing for receiving a battery, the seal arrangement comprising:
 a tubular seal housing formed as a monolithic one-piece tube encircling a central longitudinal axis, the monolithic one-piece tube having:
  a desiccant chamber section of the monolithic one-piece tube, having:
   a plurality of cutouts extending radially though an outer wall of monolithic one-piece tube, forming a grid structure in an outer wall of the monolithic one-piece tube;
   a gas permeable plastic grid or net arranged on the monolithic one-piece tube and closing the plurality of cutouts in the outer wall;
   a desiccant arranged within the desiccant chamber section entirely within the monolithic one-piece tube;
   wherein the plastic grid or net has pores sized to retain the desiccant from escaping through the plurality of cutouts;
   a cover arranged directly on the monolithic one-piece tube and closing the desiccant within the desiccant chamber section at a first axial end of the monolithic one-piece tube;

a valve arrangement section of the monolithic one-piece tube arranged within an opposite second axial end of the monolithic one-piece tube, the valve arrangement section including:
  a valve arrangement arranged within an interior of the monolithic one-piece tube and adapted to compensate a pressure differential between an interior of the battery housing for receiving a battery and the environment outside of the battery housing;
  a gas permeable membrane arranged within the interior of the monolithic one-piece tube and between the valve arrangement and the opposite second axial end of the monolithic one-piece tube;
  the valve arrangement including:
    a first valve configured to open and flow gas from the gas permeable plastic grid or net, through the desiccant chamber section and discharge to an exterior environment outside of the battery housing at the opposite second axial end of the monolithic one-piece tube; and
    a second valve configured to open and flow gas from the opposite second axial end of the monolithic one-piece tube, through the gas permeable membrane, through the desiccant chamber section and through the gas permeable plastic net when pressure in the exterior environment exceeds a predetermined differential pressure relative to an interior of the battery housing.

2. The seal arrangement according to claim 1, wherein the valve arrangement section and the desiccant chamber section are formed together as a monolithic part.

3. The seal arrangement according to claim 1, further comprising
  a connecting device adapted to detachably attach the seal arrangement on the battery housing for receiving a battery.

4. The seal arrangement according to claim 1, wherein the seal housing is provided with an outer thread,
  wherein the outer thread is adapted to detachably attach the seal arrangement on the battery housing for receiving a battery,
  wherein the valve arrangement is disposed in the seal housing.

5. The seal arrangement according to claim 1, wherein the seal housing is provided with a bayonet connection,
  wherein the bayonet connection is adapted to detachably attach the seal arrangement on the housing for receiving a battery,
  wherein the valve arrangement is disposed in the seal housing.

6. The seal arrangement according to claim 1, further comprising
  a gas permeable desiccant retaining membrane (8) arranged between the valve arrangement (9) and the desiccant chamber section (6) of the grid-like tube (30).

7. The seal arrangement according to claim 1 wherein the desiccant is silica gel.

8. A battery housing with a battery and a seal arrangement according to claim 1.

9. A vehicle comprising a battery housing with a battery and a seal arrangement according to claim 1.

* * * * *